(12) United States Patent
Ishimoto et al.

(10) Patent No.: US 9,776,566 B2
(45) Date of Patent: Oct. 3, 2017

(54) ENVIRONMENT MONITORING DEVICE FOR OPERATING MACHINERY

(71) Applicant: HITACHI CONSTRUCTION MACHINERY CO., LTD., Tokyo (JP)

(72) Inventors: Hidefumi Ishimoto, Tokyo (JP); Yoichi Kowatari, Tokyo (JP); Yoshihiro Inanobe, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 231 days.

(21) Appl. No.: 14/417,307

(22) PCT Filed: Jul. 26, 2013

(86) PCT No.: PCT/JP2013/070283
§ 371 (c)(1),
(2) Date: Jan. 26, 2015

(87) PCT Pub. No.: WO2014/017620
PCT Pub. Date: Jan. 30, 2014

(65) Prior Publication Data
US 2015/0175071 A1 Jun. 25, 2015

(30) Foreign Application Priority Data

Jul. 27, 2012 (JP) .................................. 2012-166598

(51) Int. Cl.
*B60R 1/00* (2006.01)
*G09G 5/14* (2006.01)
*H04N 7/18* (2006.01)
*E02F 9/26* (2006.01)
*E02F 3/32* (2006.01)

(52) U.S. Cl.
CPC ................ *B60R 1/00* (2013.01); *E02F 9/262* (2013.01); *H04N 7/18* (2013.01); *H04N 7/181* (2013.01); *B60R 2300/105* (2013.01); *B60R 2300/305* (2013.01); *B60R 2300/607* (2013.01); *B60R 2300/802* (2013.01); *E02F 3/32* (2013.01)

(58) Field of Classification Search
CPC ................ B60R 1/00; B60R 2300/105; B60R 2300/305; B60R 2300/607; B60R 2300/802; E02F 3/32; E02F 9/262
USPC ......................................................... 348/148
See application file for complete search history.

(56) References Cited

FOREIGN PATENT DOCUMENTS

| JP | 2007-104373 A | 4/2007 |
|---|---|---|
| JP | 2008-095307 A | 4/2008 |

(Continued)

*Primary Examiner* — Nathnael Aynalem
(74) *Attorney, Agent, or Firm* — Mattingly & Malur, PC

(57) ABSTRACT

A plurality of images captured by a plurality of cameras respectively to create a plurality of upper viewpoint images. Display images are extracted from the upper viewpoint images, and the extracted display images are synthesized to create an overhead image or bird's eye view image of surroundings, which has an image corresponding to an operating machine at a center of the bird's eye view image. When extracting each of the display images, a region of the display image extracted from the upper viewpoint image is expanded beyond the size of a standard extraction region on the basis of the set height of a mating face. Each of the extracted display images is adjusted to the size of the standard extraction region, and synthesized. Thus, any three-dimensional object (obstacle) present near the boundary between display images constituting the bird's eye view image is displayed.

5 Claims, 16 Drawing Sheets

(56) References Cited

FOREIGN PATENT DOCUMENTS

| | | |
|---|---|---|
| JP | 2008-248813 A | 10/2008 |
| JP | 2009-055427 A | 3/2009 |
| JP | 2009-118415 A | 5/2009 |
| JP | 2010-226449 A | 7/2010 |
| JP | 2010-204821 A | 9/2010 |

Part of three-dimensional object (lower half of the body) is in the left extraction region Part of three-dimensional object (lower half of the body) is in the right extraction region Part of three-dimensional object (lower half of the body) is in the right and left extraction regions

ENVIRONMENT MONITORING DEVICE FOR OPERATING MACHINERY

TECHNICAL FIELD

The present invention relates to a device for creating a bird's eye view image of an operating machine or a working machine, such as a hydraulic shovel (excavator, power shovel) and a dump truck, by means of a plurality of cameras mounted on the operating machine, with an image representing the operating machine being combined, in order to monitor surroundings (environment) of the operating machine.

BACKGROUND ART

In general, large construction machines and operating machines, such as hydraulic shovels (excavators) and dump trucks, do not have good visibility for its surrounding or environment. To deal with it, Patent Literature 1 (will be mentioned below), for example, places a camera on the right side face of an upper swing body of the hydraulic shovel and another camera on a rear portion of the upper swing body. Images captured (photographed, videotaped) by these cameras are displayed on a monitor in front of a driver's seat (operator's seat) to ensure the visibility.

Another example, such as Patent Literature 2 (will be mentioned below), discloses a device for monitoring the surroundings that has a plurality of cameras directed in four directions of a vehicle body, and applies upper viewpoint conversion (transformation) process on images of the surroundings of the vehicle body, which are photographed by these cameras. The resulting images are synthesized to create a bird's eye view image (overhead image) that has an image representing the operating machine (working machine) at its center. The bird's eye view (image) has a viewpoint above the vehicle body. This bird's eye view image is displayed on a monitor in front of a driver's seat such that a driver (operator) can have a sense of distance, for example, between the vehicle body and an obstacle present in the surroundings.

LISTING OF REFERENCES

Patent Literatures

PATENT LITERATURE 1: Japanese Patent Application Laid-Open (Kokai) Publication No. 2008-95307
PATENT LITERATURE 2: Japanese Patent Application Laid-Open (Kokai) Publication No. 2008-248613

SUMMARY OF THE INVENTION

Problems to be Solved by the Invention

When the device for monitoring the surroundings (environment monitoring device) that prepares and displays the bird's eye view image such as the monitoring device of Patent Literature 2 is used, and a relatively thin (slender, slim) and tall obstacle (three-dimensional object) such as a person or a pole exists at or near the boundary between the upper viewpoint images of the bird's eye view image, then the greater part of the obstacle may disappear and may not be displayed in the bird's eye view image. For example, if the obstacle is a person, only lower end portions of legs of the person may be displayed. If the obstacle is a pole, only a lower end portion of the pole may be displayed. Accordingly, the user of the monitoring device may not be aware of the existence of the obstacle.

The present invention is proposed to address these problems, and an object of the present invention is to provide a novel surroundings monitoring device for an operating machine (environment monitoring device for operating machinery) that can reliably display a three-dimensional object (obstacle) that exists at or in the vicinity of a boundary between any two upper view point images of (in) a bird's eye view image.

Solution to Overcome the Problems

In order to overcome these problems, a first aspect of the present invention provides a surroundings monitoring device of an operating machine that includes: a plurality of cameras mounted on a vehicle body of the operating machine and configured to photograph (capture, videotape) surroundings of the operating machine; an upper viewpoint image preparing unit configured to apply an upper viewpoint transformation on raw images captured by the cameras respectively, to prepare upper viewpoint images; a bird's eye view image creating unit configured to extract display images from the upper viewpoint images, which are prepared by the upper viewpoint image preparing unit, synthesize the extracted display images, and combine the synthesized display images with an image representing the operating machine to create a bird's eye view image of the surroundings; a display unit configured to display the bird's eye view image, which is created by the bird's eye view image creating unit; and a mating face height setting unit configured to set a hypothetical mating face height that is used when the upper viewpoints images prepared by the upper viewpoint image preparing unit are synthesized. The bird's eye view image creating unit is configured to expand a region of each of the display images to be extracted from the associated upper viewpoint image beyond a standard extraction region, based on the mating face height set by the mating face height setting unit, adjust each of the extracted display images to the size of the standard extraction region, and synthesize the adjusted display images.

With the above-described configuration, the images photographed (captured) by the cameras undergo the upper viewpoint transformation, and the display images are extracted therefrom. The extracted display images are synthesized, and the bird's eye view image of the surroundings, which has an image representing the operating machine at the center of the bird's eye view image, is created. When the bird's eye view image is created, it is possible to reliably display a three-dimensional object (obstacle) that is present on or in the vicinity of a boundary line between any two adjacent display images of the bird's eye view image.

A second aspect of the present invention provides another surroundings monitoring device of the operating machine. The mating face height setting unit of the first aspect of the present invention operates in accordance with an operating condition of the operating machine. With this configuration, it is possible to appropriately switch between a normal bird's eye view image and another bird's eye view image created based on the set value of the mating face height, in accordance with the operating condition of the operating machine (e.g., deactivated condition or working condition), and to display one of the bird's eye view images.

A third aspect of the present invention provides another surroundings monitoring device of the operating machine. The mating face height setting unit of the first aspect of the present invention is operated manually. With this configuration, it is possible for an operator to manually and arbitrarily switch between the normal bird's eye view image and the bird's eye view image created based on the set value of the mating face height in a desired manner.

A fourth aspect of the present invention provides another surroundings monitoring device of the operating machine. The mating face height setting unit of the second aspect of the present invention causes the mating face height to return to a reference (standard) mating face height upon elapse of a prescribed time, if the mating face height is set to a height different from the reference mating face height. With this configuration, after the mating face height is automatically changed (adjusted) in accordance with the operating condition of the operating machine, it is possible to prevent the operator from misunderstanding that the changed mating face height is the reference mating face height.

A fifth aspect of the present invention provides another surroundings monitoring device of the operating machine. The mating face height setting unit of the third aspect of the present invention causes the mating face height to return to the reference mating face height upon elapse of a prescribed time, if the mating face height is set to a height different from the reference mating face height. With this configuration, after the mating face height is manually changed (adjusted), it is possible to prevent the operator from misunderstanding that the changed mating face height is the reference mating face height.

According to a sixth aspect of the present invention, the surroundings monitoring device of the operating machine according to the first aspect further includes a three-dimensional object detecting unit configured to detect presence/absence of a three-dimensional object near the operating machine. The mating face height setting unit sets (decides, changes) the mating face height when the three-dimensional object detecting unit detects the three-dimensional object near the operating machine. With this configuration, it is possible to automatically switch between the normal bird's eye view image and the bird's eye view image created based on the set value of the mating face height, in accordance with the detected presence/absence of the three-dimensional object near the operating machine, and display one of the bird's eye view images.

A seventh aspect of the present invention provides another surroundings monitoring device of the operating machine. The mating face height setting unit of the sixth aspect of the present invention can set the mating face height to different heights stepwise, and adjusts the mating face height based on a type or a size of the three-dimensional object near the operating machine that is detected by the radio detecting unit. With this configuration, it is possible to automatically adjust the visibility of the three-dimensional object (obstacle) present on or in the vicinity of the boundary line between any two adjacent display images, in accordance with the type or size of the three-dimensional object.

According to an eighth aspect of the present invention, the surroundings monitoring device of the operating machine according to the first aspect further includes an image synthesizing unit configured to synthesize one or more of a character (letter), a figure (diagram) and a symbol, which represents the mating face height set by the mating face height setting unit, to the bird's eye view image created by the bird's eye view image creating unit, thereby creating a synthesized image. The display unit displays the synthesized image created by the image synthesizing unit. With this configuration, the operator can instantly and accurately recognize, with his eyes (by visual observation), not only a fact that the mating face height is changed from the reference mating height, but also how much the mating face height is changed. Because the change is synthesized to the bird's eye view image and displayed, movements of the line of sight of the operator are minimized. Thus, it is easy to see and easy to understand.

Advantages of the Invention

When the bird's eye view image of the surroundings of the operating machine is created from the images photographed (captured) by the cameras, the present invention expands the display image regions of the bird's eye view image beyond the standard extraction region based on the set height of the mating face, and synthesizes the extracted display images. As such, it is possible to reliably display a three-dimensional object (obstacle) that exists on or in the vicinity of the boundary line between the two display images. Accordingly, even if a relatively thin and tall obstacle (three-dimensional object) such as a person or a pole exists, there is no possibility that the obstacle disappears. The operator or other persons can surely recognize the presence of the obstacle.

MODE FOR CARRYING OUT THE INVENTION

Figure 1:
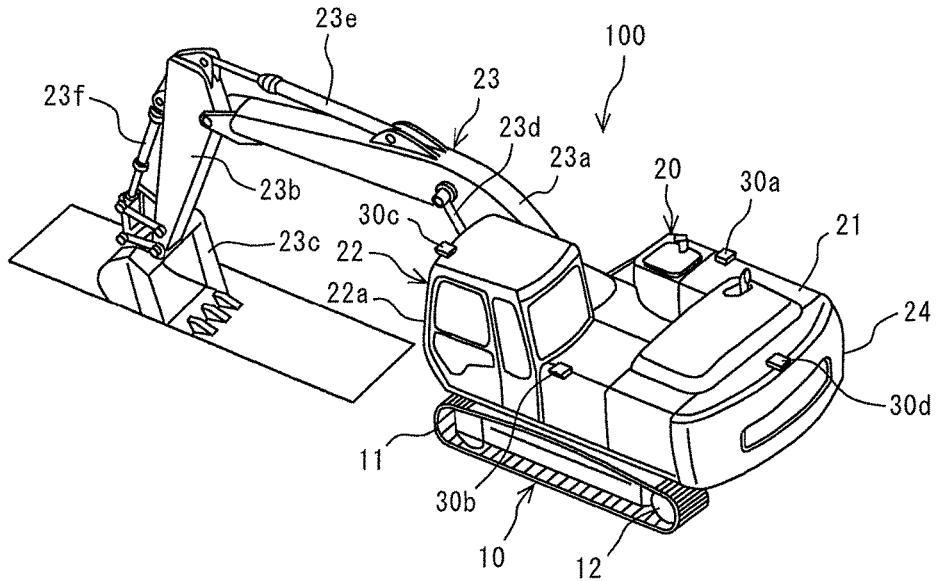
FIG. 1 is a general perspective view of a hydraulic shovel (excavator) 100 which is an exemplary operating machine according to one embodiment of the present invention.

One embodiment of the present invention will now be described with reference to the accompanying drawings. FIG. 1 illustrates a general perspective view of a hydraulic shovel (excavator) 100, which is an example of an operating machine, according the embodiment of the present invention. As shown in the drawing, the hydraulic shovel 100 includes, as its major parts, a lower traveling body 10 and an upper swing body 20 that is swingably disposed on the lower traveling body 10. The lower travelling body 10 has a pair of crawlers 11 and 11 supported by a traveling body frame (not shown) such that the crawlers 11 and 11 extend in parallel to each other. Each of the crawlers 11 and 11 is equipped with a hydraulically operated motor 12 for the traveling, which drives an associated caterpillar track (crawler belt) to travel.

The upper swing body 20 includes, as its main components, an engine room 21 disposed on a swing body frame (not shown), a driver's (operator's) cab 22 disposed at the left front of the engine room 21, a front work unit 23 extending forward from the right side of the driver's cab 22, and a counterweight 24 disposed behind the engine room 21 for keeping the weight balance to the front work unit 23. The engine room 21 houses various machines and parts such as an engine, a battery and a fuel tank.

The driver's cab 22 has a cabin 22a into which an operator (driver) gets. In the cabin 22a, there are provided an operation (manipulation) lever, a swing lever, gauges and meters, which are used to operate the front work unit 23, as well as a monitor for monitoring the surroundings (will be described). The front work unit 23 has, as its main components, a boom 23a extending forward from the swing body frame, an arm 23b swingably mounted on a front end of the boom 23a, and a bucket 23c swingably mounted on a front end of the arm 23b. The boom 23a, the arm 23b and the bucket 23c are actuated by a boom cylinder 23d, an arm cylinder 23e and a bucket cylinder 23f respectively, which are hydraulically extended and retracted.

Four cameras 30a, 30b, 30c and 30d are disposed on both sides of the engine room 21, on the top of the driver's cab 22 and on the top of the counterweight 24 such that the cameras can continuously (without gaps) photograph or videotape the views in the respective directions. Specifically, the camera 30a continuously photographs the right side area of the upper swing body 20 in an angle of view of about 180 degrees (about 90-degree swing in one direction and about 90-degree swing in an opposite direction). The photographing direction from the camera is a diagonally downward direction. The camera 30b continuously photographs the left side area of the upper swing body 20 in an angle of view of about 180 degrees (about 90-degree swing in one direction and about 90-degree swing in an opposite direction). The photographing direction from the camera is a diagonally downward direction. The camera 30c continuously photographs the front (forward) area of the upper swing body 20 in an angle of view of about 180 degrees (about 90-degree swing in one direction and about 90-degree swing in an opposite direction). The photographing direction from the camera is a diagonally downward direction. The camera 30d continuously photographs the rear (backward) area of the upper swing body 20 in an angle of view of about 180 degrees (about 90-degree swing in one direction and about 90-degree swing in an opposite direction). The photographing direction from the camera is a diagonally downward direction.

Figure 2:
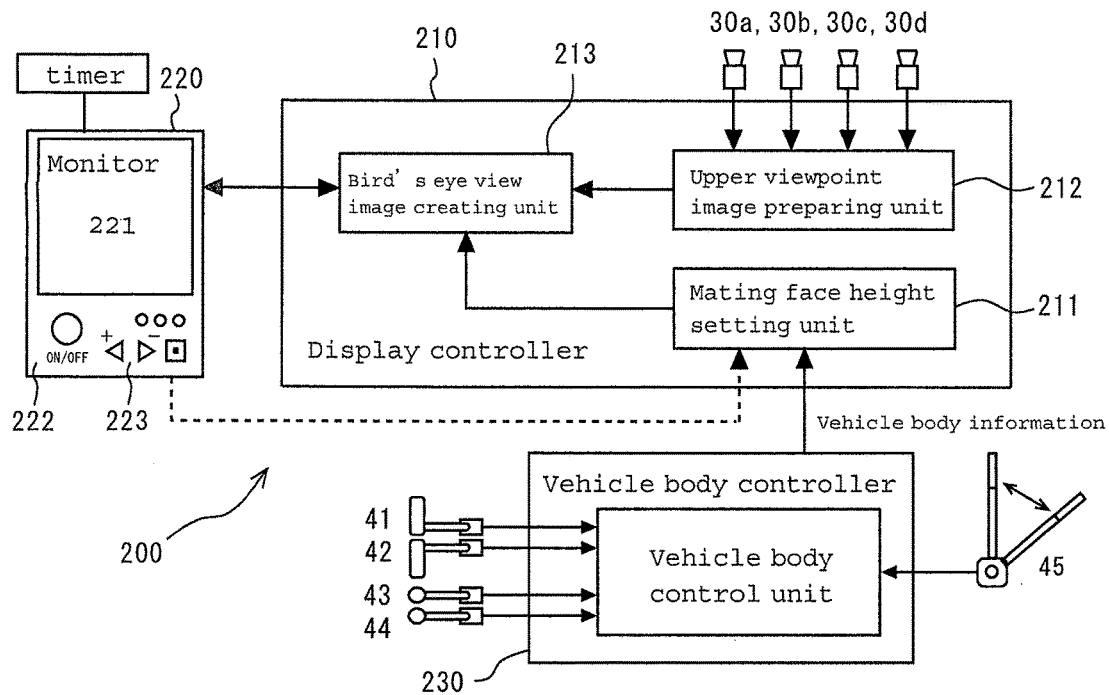
FIG. 2 is a block diagram of an exemplary surroundings monitoring device 200 according to the embodiment of the present invention.
Figure 3:
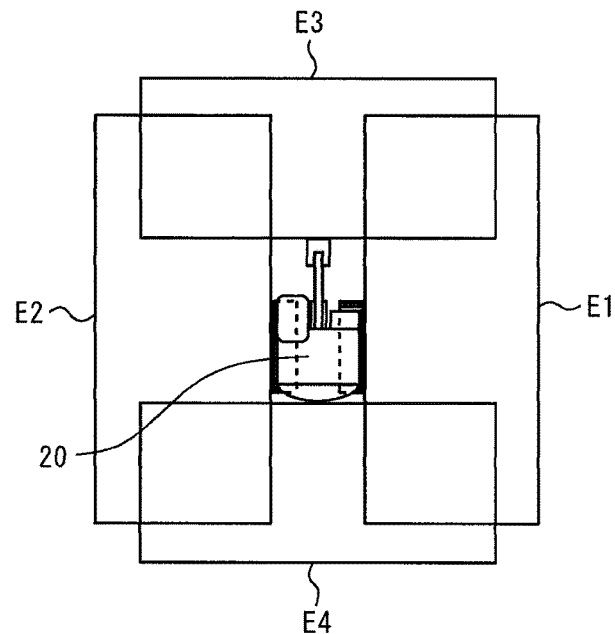
FIG. 3 is a conceptual diagram showing photographing regions of respective cameras 30 mounted on a vehicle body.

As shown in FIG. 2, images photographed by the cameras 30a, 30b, 30c and 30d (raw images) are introduced to a display controller 210 of the surroundings monitoring device 200 of the embodiment of the invention. Each of the cameras 30a, 30b, 30c and 30d may include a wide angle video camera that has an image pick up element (e.g., CCD or CMOS), which is excellent in durability and weather resistance (weatherproof), and a wide angle lens, or other types of photographing device. In the following description, the upper swing body 20 having the cameras 30a, 30b, 30c and 30d thereon is generally referred to as a "vehicle body 20."

FIG. 2 shows a block diagram of the exemplary surroundings monitoring device 200 according to the embodiment of the present invention, which is installed in the hydraulic shovel 100. As depicted in FIG. 2, the surroundings monitoring device 200 includes, as its main components, the display controller 210 and a monitoring unit 220 for monitoring the surroundings. The display controller 210 has a mating face height setting unit 211, an upper viewpoint image preparing unit 212, and a bird's eye view image creating unit 213. The display controller 210 includes an image processing LSI (hardware) circuit (not shown) that has a CPU, a RAM, a ROM, an input/output interface and the like. The CPU uses various data, dedicated image processing programs and other information, which are stored in the ROM in advance and stored in other memories, and controls the functioning of the respective units 211-213.

The mating face height setting unit 211 receives a vehicle body control signal from a vehicle body controller 230, which controls the hydraulic shovel 100, and decides (sets) a hypothetical mating face height that is used when a bird's eye view image creating unit 213 synthesizes the upper viewpoint images based on the received control signal. It should be noted that the vehicle body control signal that is entered to the mating face height setting unit 211 from the vehicle body controller 230 is not limited to a particular signal. For example, the vehicle body control signal includes operation signals from a lever 41 for left traveling, a lever 42 for right traveling, a lever 43 for left swinging, a lever 44 for right swinging, and a lock lever 45.

The upper viewpoint image preparing unit 212 prepares upper viewpoint images from a plurality of (four) raw images, which are captured (photographed) by the cameras 30a, 30b, 30c and 30d respectively, at the unit of "30 frames/second" for example, and sends the prepared upper viewpoint images (video, moving picture) to the bird's eye view image creating unit 213. Specifically, when the upper viewpoint image preparing unit 212 receives composite signals such as NTSC of the raw images from the cameras 30a, 30b, 30c and 30d, the upper viewpoint image preparing unit 212 applies the A/D (analog-to-digital) conversion to the composite signals for the decoding to obtain RGB signals. The RGB signals are stored in a dedicated frame memory. Then, the upper viewpoint image preparing unit 212 applies a lens distortion correcting process on the RGB signals, and applies a known image transforming process (e.g., plane projective transformation processing using a nomography matrix or other projection processing in the three-dimensional space) to obtain the upper viewpoint images. Thus, the raw images are transformed to the upper viewpoint images, with the viewpoints thereof being shifted to the above.

FIGS. 3 and 5(a)-5(c) are the drawings useful to describe the upper viewpoint image conversion (transformation) performed by the upper viewpoint image preparing unit 212. Firstly, referring to FIG. 3, rectangular areas E1, E2, E3 and E4 around the vehicle body 20 represent areas that can be photographed by the cameras 30a, 30b, 30c and 30d mounted on the vehicle body 20, respectively. The rectangular areas E1, E2, E3 and E4 are photographed such that each two adjacent rectangular areas overlap at their both ends.

Figure 5A:
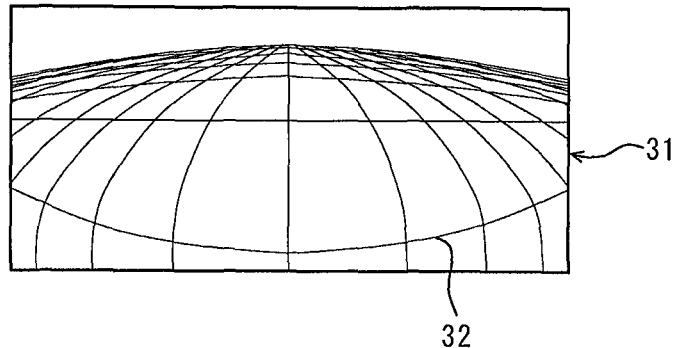
FIGS. 5(a), 5(b) and 5(c) are conceptual diagrams, useful to show a sequence of image processing to obtain an upper viewpoint image by applying a lens distortion correction and a viewpoint transformation on the raw image 31 as photographed.
Figure 5B:
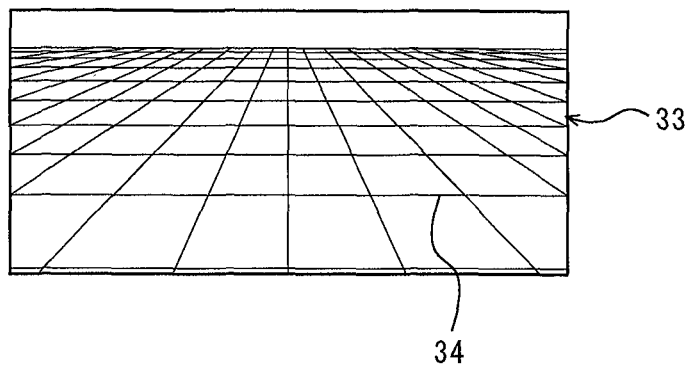

FIG. 5(a) shows an example of the raw image 31 of the rectangular area E1, E2, E3 or E4 that is photographed by the camera 30a, 30b, 30c or 30d. In general, the raw image 31 photographed by each camera 30a, 30b, 30c, 30d is distorted in such way that the center portion is expanded and the peripheral portions are shrunk, as generally indicated by the grid line 32, because the rectangular area is photographed with the wide angle lens having an about 180-degree angle of view. FIG. 5(b) shows an after-correction image (corrected image) 33, which has undergone the lens distortion correcting process of the upper viewpoint image preparing unit 212. The corrected image 33 is the image corrected in accordance with the laws of perspective from the viewpoint of each camera 30a, 30b, 30c, 30d, as indicated by hypothetical coordinate lines 34 including the vertical and crossing lines on the ground (street surface). The lens distortion correcting process is performed, for example, by the pixel coordinate transformation using a dedicated pixel transformation table that describes the relationship between the addresses of the pixels of the before-transformation image and the addresses of the pixels of the after-transformation image. The relationship of these addresses is, for example, stored in a memory in advance.

Figure 5C:
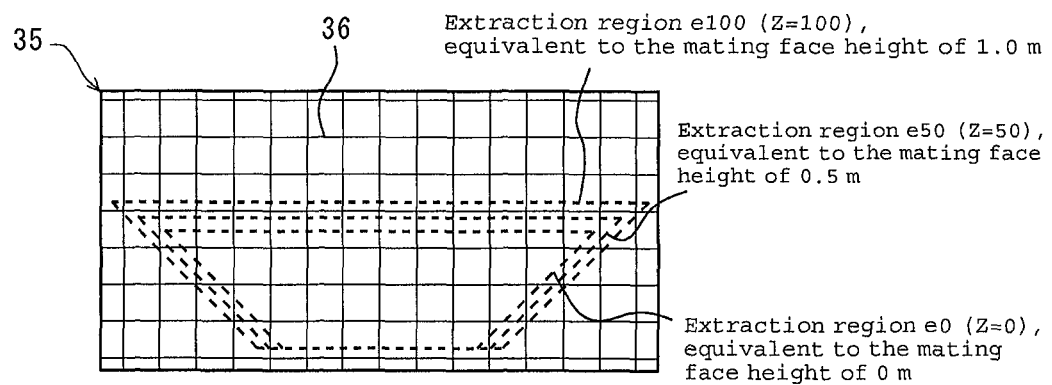

FIG. 5(c) shows an upper viewpoint image 35 after the viewpoint transformation processing is applied to the ground (street surface) image 33. The image 33 is prepared by the lens distortion correcting process of FIG. 5(b). The upper viewpoint image 35, which is obtained after the viewpoint transformation processing, has the viewpoint shifted to the above-the-vehicle from the vehicle body side portion. The hypothetical coordinate lines 34 of FIG. 5(b) are transformed to hypothetical rectangular coordinate lines 36. This viewpoint transformation process is also performed by the pixel coordinate transformation using the dedicated pixel transformation table that is stored in the memory in advance.

Figure 4:
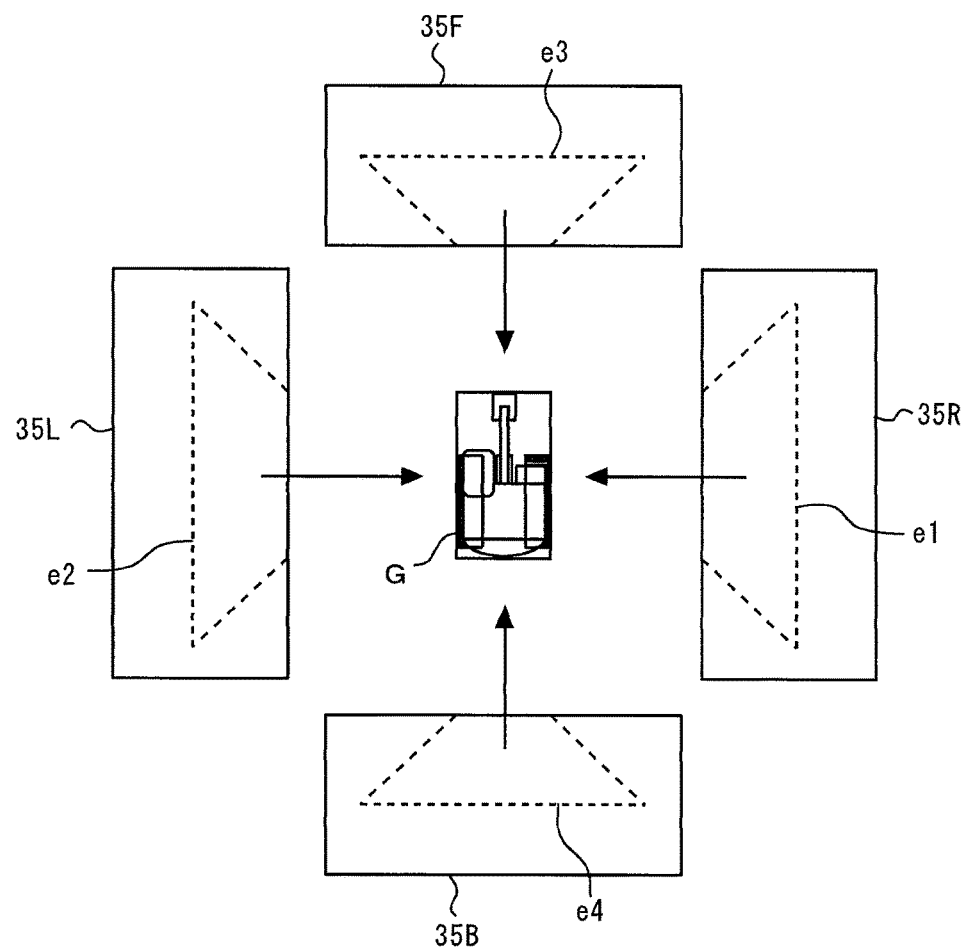
FIG. 4 is a conceptual diagram showing exemplary creation of upper viewpoint images 35 from photographed images and exemplary synthesis of the upper viewpoint images.

The bird's eye view image creating unit 213 extracts images to be actually displayed, from the upper viewpoint images 35 prepared in the above-described manner. The bird's eye view image creating unit 213 synthesizes the extracted images to create a bird's eye view image (moving picture) of the surroundings of the operating machine, which has an image representing the operating machine at the center of the bird's eye view image. In FIG. 5(c), trapezoidal extraction regions e0 to e100 surrounded by the broken lines are examples of display images (images to be displayed), which are extracted from the upper viewpoint images 35 by the bird's eye view image creating unit 213 after excluding (removing) the overlapping portions of the upper viewpoint images 35 to obtain an easy-to-see synthesized image. As shown in FIG. 4, the bird's eye view image creating unit 213 annularly connects the display images e1 to e4, which are extracted from the four upper viewpoint transformed images 35, around the image G which represents the hydraulic shovel 100 such that a single continuous bird's eye view image 300 showing the entire surroundings of the vehicle body is produced. The image G is situated at the center of the connected display images e1 to e4. The image data of the bird's eye view image 300 is sent to the frame memory.

Figure 6:
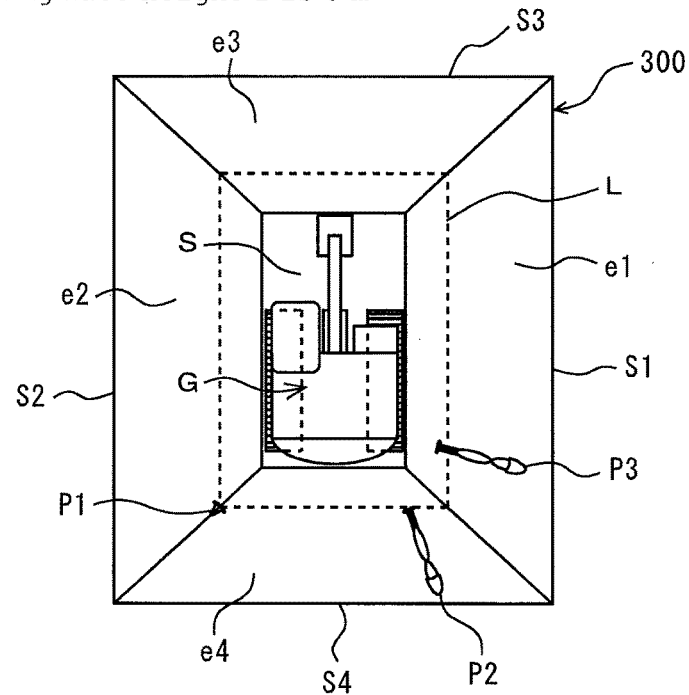
FIG. 6 is a conceptual diagram showing an exemplary bird's eye view image 300 created when the mating face height is 0 m (reference height).

FIG. 6 shows one example of the bird's eye view image 300 that is prepared by the bird's eye view image creating unit 213 and is displayed on the surroundings monitoring unit 220. A rectangular display area S is defined in the center region of the image 300 to display the vehicle body image G representing the hydraulic shovel 100. The vehicle body image G is prepared in advance. The image 300 has independent trapezoidal display areas S1 to S4 on the right and left of the display area S as well as in front of and behind the display area S, with the display area S being the center. The display images e1 to e4, which are extracted from the respective upper viewpoint images 35 in accordance with the associated display areas, are arranged (fitted) in the display areas S1 to S4 respectively.

Specifically, the display image of the extraction region e1 from the upper viewpoint image 35R that is obtained from the photographed image on the right side of the upper swing body 20 photographed by the camera 30a as shown in FIG. 4 is fitted in the display area S1. The display image of the extraction region e2 from the upper viewpoint image 35L that is obtained from the photographed image on the left side of the upper swing body 20 photographed by the camera 30b as shown in FIG. 4 is fitted in the display area S2. The display image of the extraction region e3 from the upper viewpoint image 35F that is obtained from the image in front of the upper swing body 20 photographed by the camera 30c as shown in FIG. 4 is fitted in the display area S3. The display image of the extraction region e4 from the upper viewpoint image 35B that is obtained from the image behind the upper swing body 20 photographed by the camera 30*d* as shown in FIG. 4 is fitted in the display area S4. As a result, it is recognized from the exemplary bird's eye view image 300 of FIG. 6 that at least two persons P2 and P3 are present in the diagonally right backward direction of the hydraulic shovel 100.

The surroundings monitoring unit 220 receives the bird's eye view image 300 of the entire surroundings image around the vehicle body which is created by the bird's eye view image creating unit 213, and displays the bird's eye view image. Specifically, the surroundings monitoring unit 220 stores the data of the received bird's eye view image 300 in the output frame memory, encodes the data (RGB signals) of the synthesized image to composite signals, applies the D/A (digital-to-analog) conversion to the composite signals, and displays the resulting signals on the display unit 221. It should be noted that the surroundings monitoring unit 220 includes the display unit 221 and an input unit 222. An operator (driver) operates the input unit 222 to perform various functions. For example, the operator operates the input unit 222 to turn on and off a power supply. The input unit 222 may also be used to enlarge, reduce and rotate (turn) the displayed synthesized image, and change the region-to-be-displayed of the synthesized image. The input unit 222 may also be used to switch between a normal mode for displaying an image photographed by the camera and a dual mode for displaying two images in a single screen.

Figure 9:
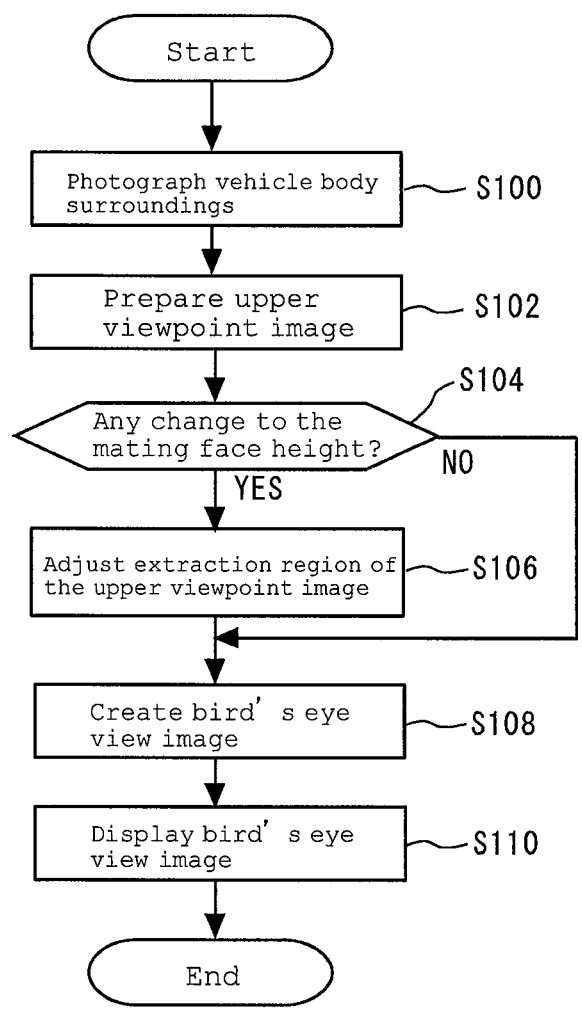
FIG. 9 is a flowchart showing a sequence of processing performed by the surroundings monitoring device 200 according to the embodiment of the present invention.

The functioning of the surroundings monitoring device 200 of this embodiment that has the above-described configuration will be described with reference to the flowchart shown in FIG. 9. Firstly, the display controller 210 of the surroundings monitoring device 200 performs an initial system check upon receiving an electric power from a power supply (turning on of the power supply). When the display controller 210 of the surroundings monitoring device 200 does not find abnormality, it proceeds to the first step (Step S100). In Step S100, the surroundings of the vehicle is photographed by the four cameras 30*a*, 30*b*, 30*c* and 30*d* oriented (directed) in the four directions of the vehicle body 20 as described above, and the images of the surroundings around the vehicle body 20 are obtained. The display controller 210 then proceeds to the next step (Step S102).

In Step S102, the four raw images 31 which are obtained by the photographing undergo the upper viewpoint conversion (transformation) process as described above, to prepare the respective upper viewpoint images 35 (FIG. 5(*c*)). The display controller 210 then proceeds to Step S104. In Step S104, it is determined whether or not the setting of the mating face height Z includes the change, i.e., whether or not the mating face height is different from the height of the reference extraction region. When it is determined that the setting of the mating face height Z does not include the change (NO), the display controller 210 jumps to Step S108. When it is determined that the setting of the mating face height Z includes the change (YES), the display controller 210 proceeds to Step S106.

In Step S106, the extraction region of each of the upper viewpoint images 35 (i.e., display image) is adjusted based on the correction value applied to the mating face height Z (will be described later). Then, the display controller 210 proceeds to Step S108 to create the bird's eye view image. In Step S110, the display controller 210 causes the surroundings monitoring unit 220 to display the bird's eye view image, and completes the processing.

The term "mating face height Z" in Step S104 uses, as the reference, the extraction region on the actual ground surface (height is 0 m) (reference extraction region). The mating face height Z of the extraction region of the upper viewpoint image 35 is calculated from the reference extraction region. The mating face height Z is a hypothetical ground height. For example, the mating face height Z may be set to one of a plurality of values such as 0.5 m and 1.0 m. The bird's eye view image 300 shown in FIG. 6 is created by the display images that are extracted when the mating face height Z is 0 m (i.e., the actual ground surface (height is 0 m) is used). In this case, the two persons P2 and P3 are displayed clearly and entirely in the diagonally right backward direction from the hydraulic shovel 100. With regard to another person P1 present on the boundary line in the diagonally left backward direction, however, only foots of the person P1 are displayed. Most part of the person P1 disappears, and it is difficult to recognize the presence of the person P1.

Figure 10A:
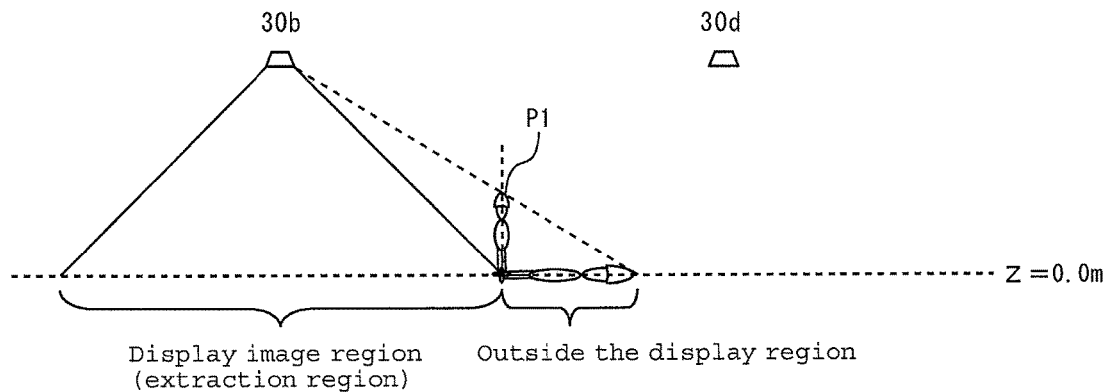
FIGS. 10(a), 10(b) and 10(c) are conceptual diagrams, showing different display regions (extraction regions) of upper viewpoint images when the mating face height Z is 0 m.
Figure 10B:
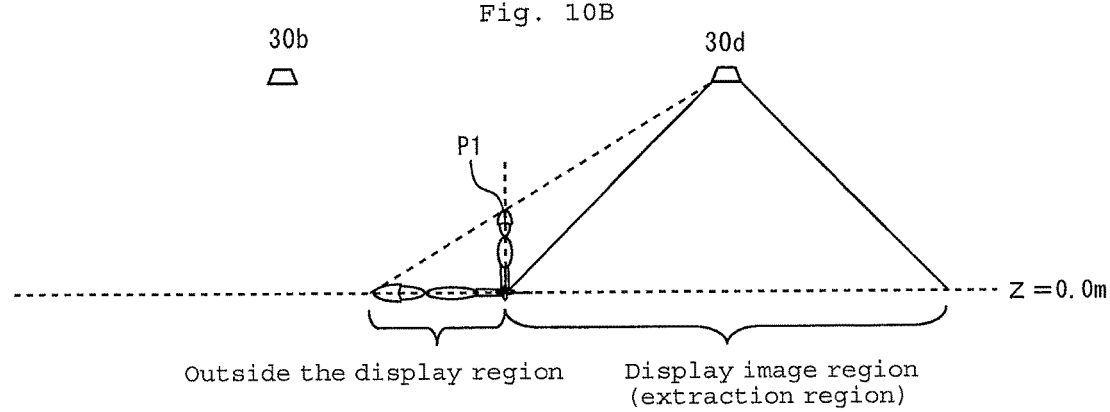
Figure 10C:
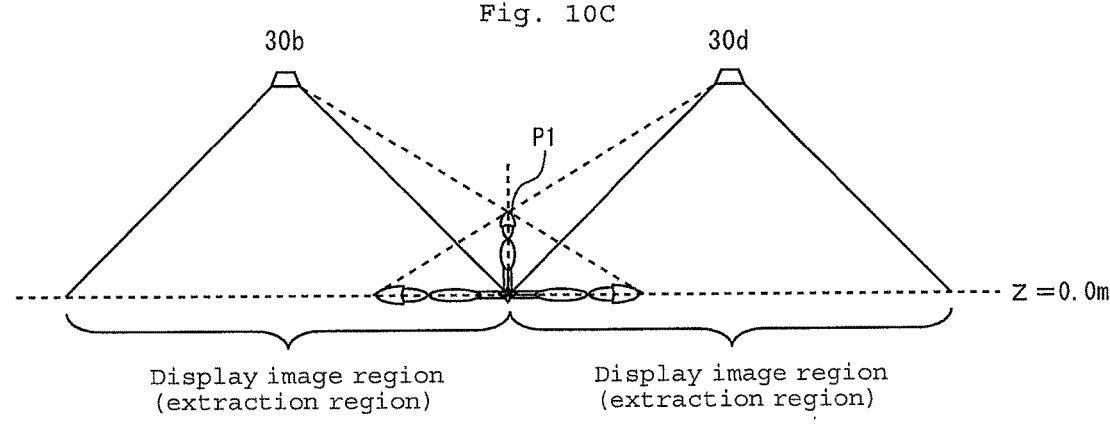

The reason why only the foots of the person P1 are displayed in the bird's eye view image 300 of FIG. 6 is because the four display images are extracted from the four upper viewpoint images 35 using the extraction region e0 (FIG. 5(*c*)) respectively, and simply fitted in the display areas S1 to S4 of the bird's eye view image 300 respectively. The display images (extracted images) hardly overlap at their boundaries when the display images are connected (combined) to the bird's eye view image. Specifically, if the person P1 is present (stands) on or in the vicinity of the boundary line between the two standard (reference) extraction regions (display image regions) of the two upper viewpoint images photographed by the two adjacent cameras (e.g., cameras 30*b* and 30*d* as shown in FIG. 10(*a*) to FIG. 10(*c*)), the entire figure (shape) of the person P1 is included in the upper viewpoint images prior to the extraction, but most part of the person P1 is put outside the display regions because the standard extraction region e0 is used and the upper viewpoint images (after extraction) do not overlap at the boundary line.

As such, when the display images which are extracted in accordance with the standard extraction region e0 are synthesized to create the bird's eye view image, only the foots of the person P1 are displayed at the boundary between the display images of the synthesized image. This results in a possibility that the driver (operator) may inadvertently overlook the presence of the person P1 on or in the vicinity of the boundary line between the extracted regions of the upper viewpoint images although the person P1 does exist.

Figure 11A:
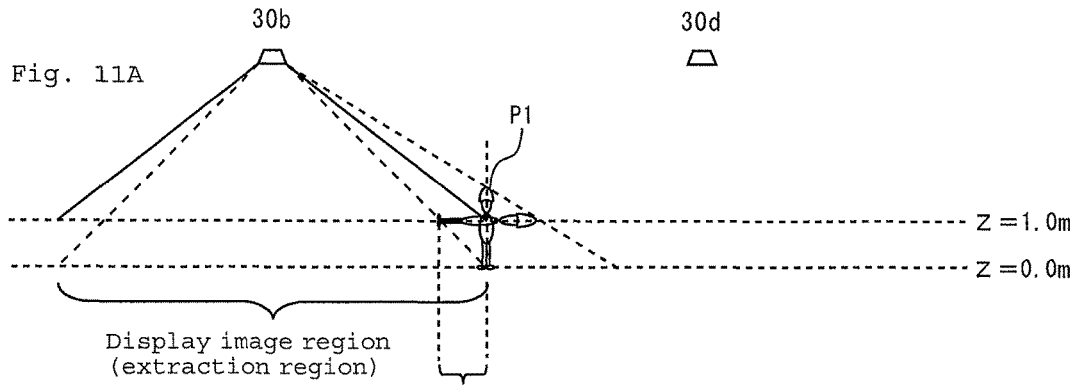
FIGS. 11(a), 11(b) and 11(c) are conceptual diagrams, showing different display regions (extraction regions) of upper viewpoint images when the mating face height Z is 1.0 m.
Figure 11B:
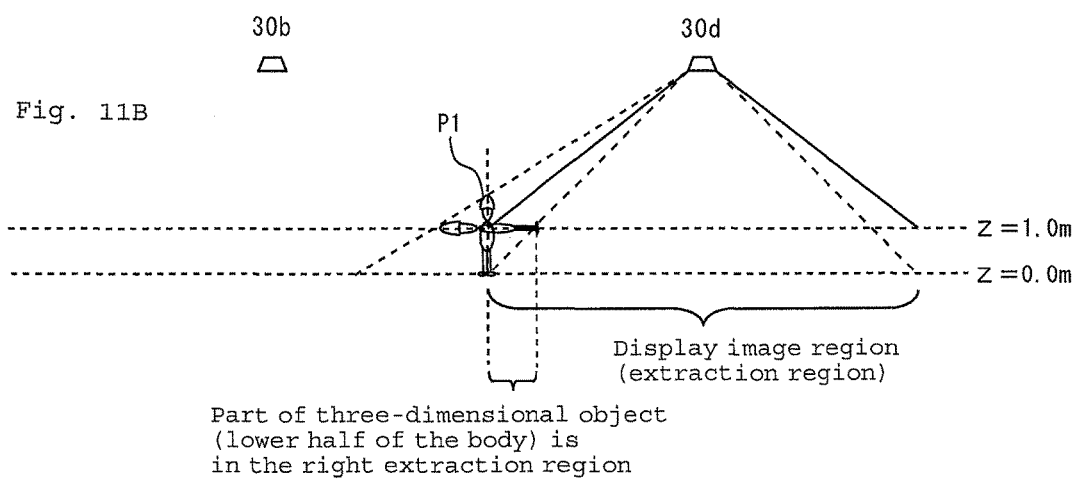
Figure 11C:
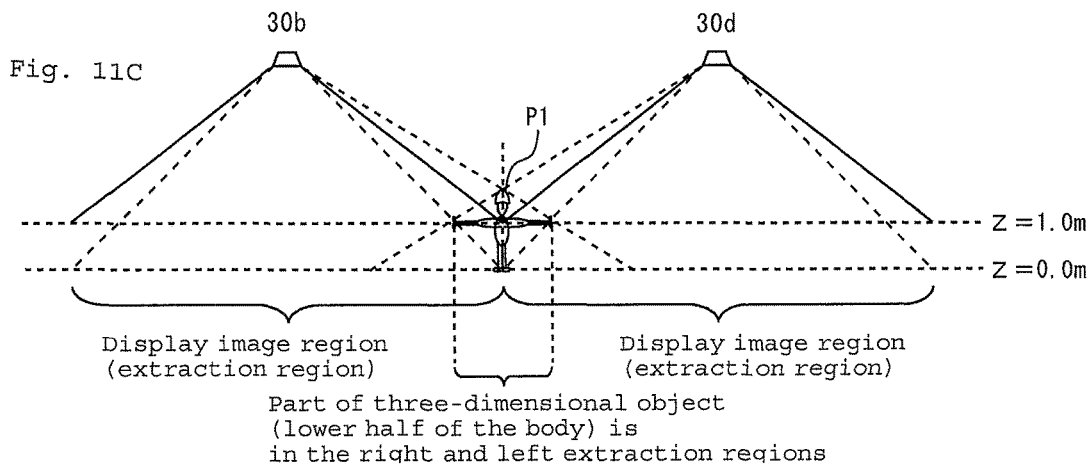

To prevent this, the embodiment of the present invention includes the mating face setting unit 211 to set (decide) a hypothetical mating face height. In Step S106, a hypothetical ground height higher than the actual ground surface height (Z=0.0 m), which is the reference height, is set as a hypothetical mating face height Z (e.g., 1.0 m high from the ground; Z=1.0 m). Then, this hypothetical ground surface is assumed as the ground surface when setting (deciding) the extraction regions of the respective upper viewpoint images. By doing so, at least from the foots to the chest of the person P1 who is standing on or in the vicinity of the boundary line between the upper viewpoint images photographed by the cameras 30*b* and 30*d* are, for example, included in the extraction regions of the upper viewpoint images, as shown in FIGS. 11(*a*) to 11(*c*). Accordingly, when the bird's eye view image is created, the extracted images sufficiently overlap at the boundary line as shown in FIG. 11(*c*), and the synthesized image is displayed. Thus, the driver (operator) does not inadvertently overlook the person P1.

Figure 7:
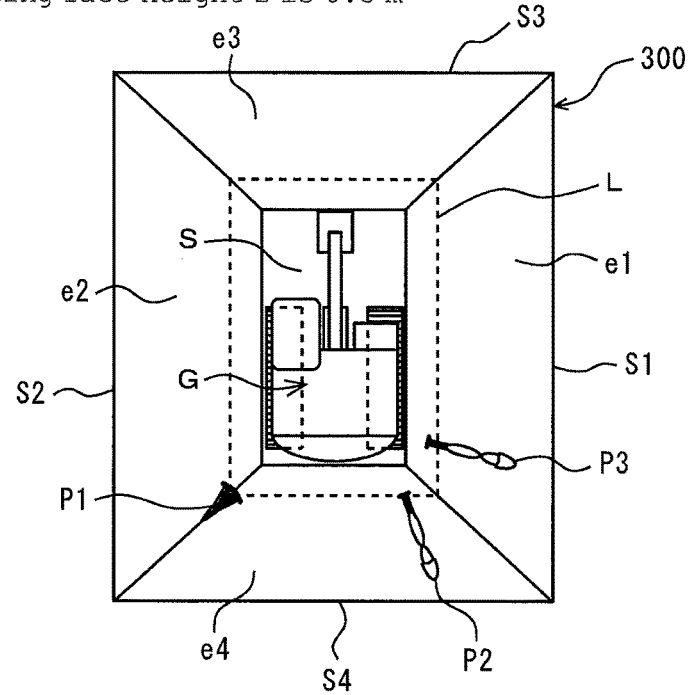
FIG. 7 is a conceptual diagram showing an exemplary bird's eye view image 300 created when the mating face height is 0.5 m.
Figure 8:
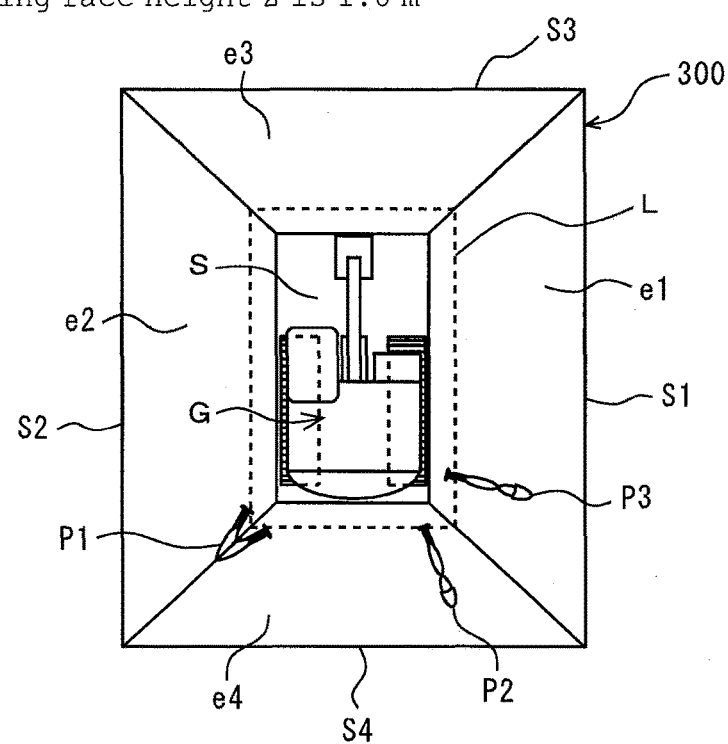
FIG. 8 is a conceptual diagram showing an exemplary bird's eye view image 300 created when the mating face height is 1.0 m.

FIG. 7 shows an example of the bird's eye view image 300 when the mating face height Z is set to 0.5 m, and FIG. 8 shows an example of the bird's eye view image 300 when the mating face height Z is set to 1.0 m. When the mating face height Z is 0 m as shown in FIG. 6 (no change), the foots (ankles) of the person P1 are only displayed in the vicinity of the boundary line in the diagonally left backward direction of the hydraulic shovel 100. However, when the mating face height Z becomes 0.5 m as shown in FIG. 7, from the foots to the knees of the person P1 are displayed. When the mating face height Z becomes 1.0 m as shown in FIG. 8, from the foots to the chest of the person P1 are displayed. With this level of display, it is possible to clearly recognize, on the surroundings monitoring unit 220, the presence of the person on or in the vicinity of the boundary line in the diagonally left backward direction of the hydraulic shovel 100.

As the mating face height Z becomes higher, more part of the person P1 who stands in the vicinity of the boundary line is displayed. At the same time, however, the size of the person and obstacle becomes smaller (i.e., the person and the obstacle become difficult to see) as the mating face height Z becomes higher. In consideration of this fact, it is preferred that the mating face height Z is at most about 2.0 m (Z=2.0 m) high from the ground. The broken-line rectangle L in each of FIGS. 6 to 8 is the line that indicates the distance (e.g., 1.0 m) from the outer edge of the operating machine G. From the bird's eye view images 300 shown in FIGS. 6 to 8, it is understood that the person P1 standing at the distance of about 1.0 m in the left backward direction of the hydraulic shovel 100 is more clearly recognized as the mating face height becomes higher. At the same time, the line L becomes closer to the center area as the mating face height Z increases. This makes the persons P2 and P3 smaller.

When the mating face height Z is changed (adjusted) in the above-described manner, the extraction region expands beyond the normal extraction region (e0) as shown in FIG. 5(c), and therefore the display image becomes larger. The enlarged display image does not fit in the associated display area S1, S2, S3, S4 of the bird's eye view image 300 if no adjustment is made to the enlarged display image. To deal with this, when the mating face height Z is changed, the processing for reducing the extraction region is needed such that the reduced extraction region matches the standard extraction region e0 (standard region) having the mating face height Z of 0 m. In the example shown in FIG. 5(c), the extraction region e50 with the mating face height Z being 0.5 m is larger than the extraction region e0 with the mating face height Z being 0 m (standard region), and the extraction region e100 with the mating face height Z being 1.0 m is even larger. Thus, when the bird's eye view image 300 is created using the display images having the extraction region e50 or e100, it is necessary to carry out the processing to reduce (adjust) the display images of the extraction region e50, e100 in accordance with (to conform to the size of) the standard extraction region e0.

By changing the mating face height Z to become higher than the normal (standard) height in the above-described manner, it is possible to reliably display, in the bird's eye view image 300, a tall three-dimensional object (obstacle) such as a person or pole even when the tall three-dimensional object is present in the vicinity of the border line in the bird's eye view image 300.

As mentioned above, when the mating face height Z is changed (increased) to a higher height, the obstacle is displayed in a smaller size and/or the obstacle is displayed in an overlapping manner in the vicinity of the boundary line between the two images. To deal with this, it is possible to suitably adjust an amount of the change (change value) to be applied to the mating face height Z in accordance with given conditions. For example, if the operating machine to which the surroundings monitoring device 200 according to the embodiment of the present invention is applied is the hydraulic shovel 100 shown in FIG. 1, the mating face height Z at the time of deactivation of the hydraulic shovel 100 is set to the standard (reference) height (0 m), and the mating face height Z may be changed to a desired mating face height Z (e.g., 1.0 m), which is manually switched (changed) by an operator, upon or after activation of the hydraulic shovel 100. The desired mating face height may be decided by the operator. The display controller 210 may send the result of the change to the surroundings monitoring unit 220 to display the result of the change on the surroundings monitoring unit 220.

Specifically, as shown in FIG. 2, the input unit 222 of the surroundings monitoring unit 220 or another unit may have a changeover switch unit 223 having two switches. One of the two switches allows the operator to manually change the mating face height Z to a higher height, and another switch allows the operator to manually change the mating face height Z to a lower height. As the operator in the driver's cab 22 manually operates the switchover unit 223, the mating face height setting unit 211 of the display controller 210 changes the mating face height Z upon receiving a mating face height change signal from the changeover switch unit 223 of the surroundings monitoring unit 220. Accordingly the operator can arbitrarily change the mating face height Z.

For example, when the operator pushes stepwise (twice) one of the switches of the changeover switch unit 223 that triggers the increase of the mating face height Z, the mating face height Z is increased to 0.5 m from the standard (reference) height (0 m), and then increased to 1.0 m from 0.5 m. Thus, the stepwise increasing change can be made. When the operator pushes stepwise (twice) the other switch of the changeover switch unit 223 that triggers the decrease of the mating face height Z, the mating face height Z is decreased to 0.5 m from 1.0 m and then decreased to the standard height (0 m) from 0.5 m. Thus, the stepwise decreasing change can be made.

After the mating face height Z is manually changed in the above-described manner, the mating face height Z may be automatically returned to the reference height (0 m) in order to prevent the operator from misunderstanding that the changed mating face height Z is the reference height (0 m). Specifically, as shown in FIG. 2, a timer shown in the drawing may be provided in the surroundings monitoring unit 220, and the surroundings monitoring unit 220 may send a switching signal to the mating face height setting unit 211 when a certain time set by the timer (prescribed time) elapses. This switching signal is a mating face height switching signal to change the current mating face height Z to the reference height (0 m). Upon receiving the mating face height switching signal, the mating face height setting unit 211 may return the current mating face height Z to the reference height (0 m) in response to the mating face height switching signal.

It should also be noted that the mating face height Z may automatically be adjusted in accordance with the operating (running) condition of the hydraulic shovel 100. For example, as shown in FIG. 2, the mating face height Z may automatically be changed to 1.0 m from the reference height (0 m) when the mating face height setting unit 211 receives from the vehicle body controller 230 a signal generated upon manipulation of any one of the right and left levers 41 and 42 for the traveling, the right and left levers 43 and 44 for the swinging, and the lock lever 45 or upon manipulation of any two (or more) of these levers in combination.

Figure 12:
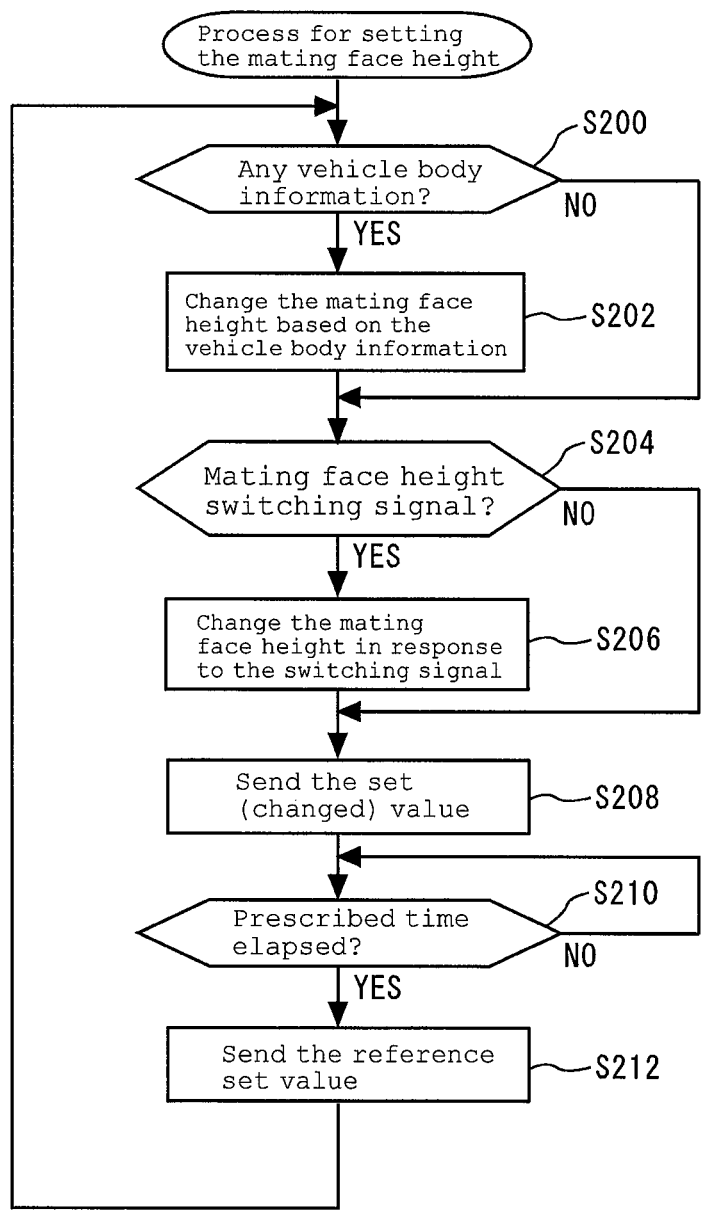
FIG. 12 is a flowchart showing an exemplary sequence of processing for setting the mating face height, performed by the mating face height setting unit 211.
Figure 13:
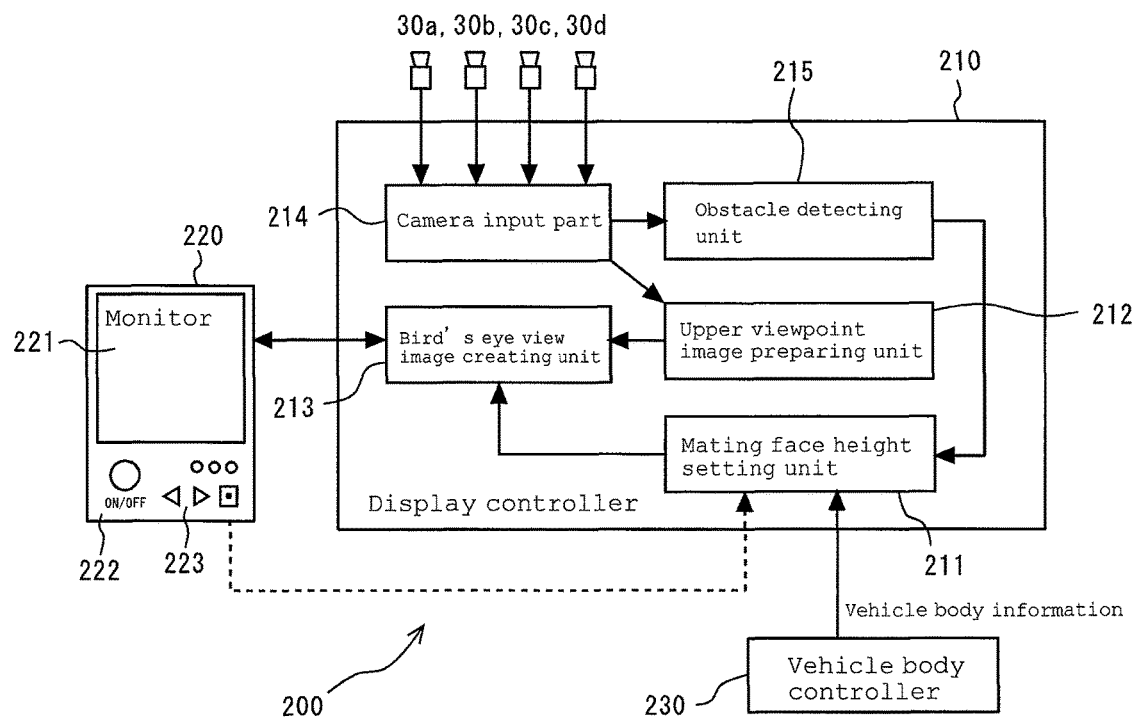
FIG. 13 is a block diagram of another exemplary surroundings monitoring device 200 according to another embodiment of the present invention.

FIG. 12 shows an exemplary process for setting the mating face height, which is carried out by the mating face height setting unit 211, in the above-described manner. Firstly, the mating face height setting unit 211 monitors the vehicle conditions (vehicle body information) from the vehicle body controller 230 at the first step of the process (Step S200) to determine whether a signal is generated or not as a result of manipulation of one or more of the levers 41 and 42 for the traveling, the levers 43 and 44 for the swinging, and the lock lever 45. When there is no signal representing the manipulation of any lever (no vehicle body information) (NO), the mating face height setting unit 211 jumps to Step S204. When there is a signal representing the manipulation of one or more levers (vehicle body information) (YES), then the mating face height setting unit 211 proceeds to Step S202 to automatically change the mating face height Z to 1.0 m from the reference height (0 m), and proceeds to the next step (Step S204).

In Step S204, the mating face height setting unit 211 monitors whether the switching signal for switching the mating face height Z by means of the manual operation is received from the surroundings monitoring unit 220. If the switching signal is not received (NO), the mating face height setting unit 211 jumps to Step S208. If the switching signal is received (YES), the mating face height setting unit 211 proceeds to Step S206 to change the mating face height Z in response to the switching signal, and then proceeds to the next step (Step S208). In Step S208, the mating face height setting unit 211 sends the set value or the changed value to the bird's eye view image creating unit 213, and proceeds to the subsequent step (Step S210). The bird's eye view image creating unit 213 decides the display areas (extraction regions) of the respective upper viewpoint images 35 in accordance with the set value or the changed value, and creates the bird's eye view image 300, as described above.

In Step S210, the mating face height setting unit 211 monitors the signal from a timer of the surroundings monitoring unit 220. When the mating face height setting unit 211 receives a signal representing a fact that the time set by the timer (prescribed time) has elapsed (YES), it proceeds to Step S212 to send the set value (0 m) of the reference mating face height Z to the bird's eye view image creating unit 213, and returns to the first step (Step S200). With this loop, it is possible to automatically cause the mating face height Z to return to the reference height (0 m) upon elapse of the prescribed time, even if the mating face height Z changes.

FIGS. 13 to 23 illustrate other embodiments of the surroundings monitoring device 200 according the present invention. Referring first to the embodiment shown in FIG. 13, the display controller 210 further includes a camera input part 214 and an obstacle detecting unit 215, and sends the images photographed by the cameras 30a, 30b, 30c and 30d to the upper viewpoint image preparing unit 212 and the obstacle detecting unit 215 through the camera input part 214. The display controller 210 detects (determines) the presence/absence of the obstacle by processing the images introduced to the obstacle detecting unit 215. When any obstacle is detected nearby (in the vicinity of the surroundings monitoring device), the surroundings monitoring device 200 causes the mating face height setting unit 211 to change the mating face height Z based on the information of the detected obstacle. Accordingly, when there is an obstacle around the vehicle body 20, or when an obstacle approaches the vehicle body 20, it is possible to reliably display the obstacle on the bird's eye view image 300.

Figure 14:
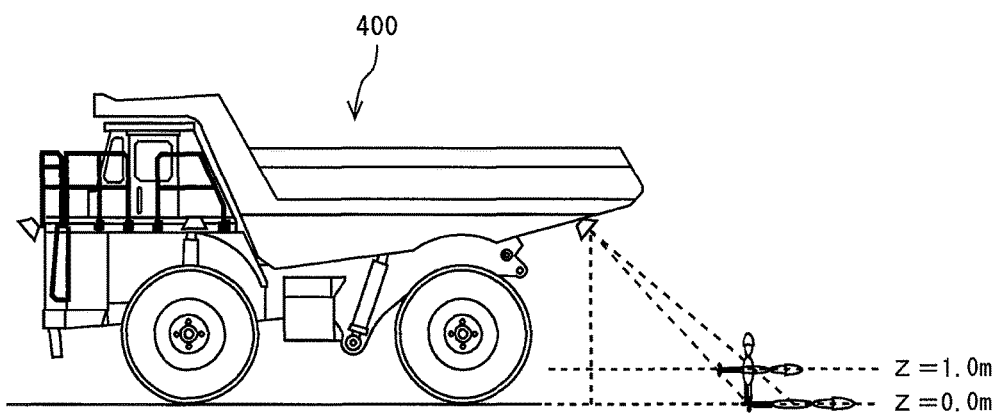
FIG. 14 is a conceptual diagram showing relationship between the operating machine, i.e., dump truck 400, and the mating face height Z.

FIG. 14 illustrates another embodiment. In FIG. 14, the operating machine to which the surroundings monitoring device 200 according to the invention is applied is a large (heavy duty) dump truck 400. In this embodiment, the mating face height Z prior to the startup of the engine is set to the reference value (0 m). The mating face height Z may automatically be changed to, for example, 1.0 m in response to a certain trigger, such as the startup of the engine or the like.

Figure 15:
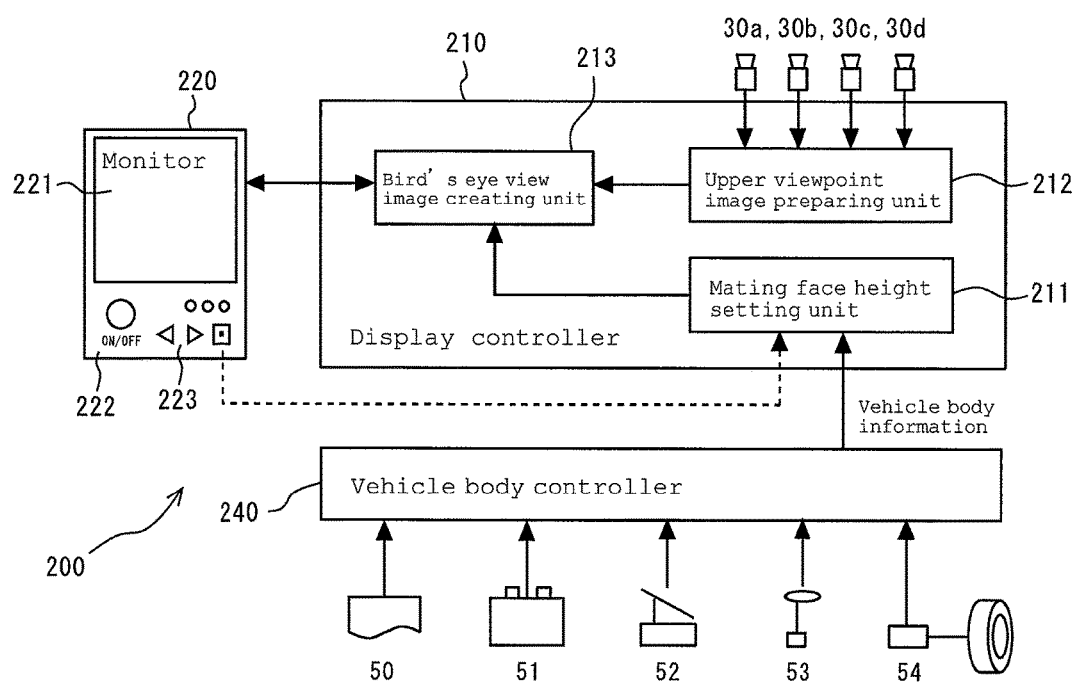
FIG. 15 is a block diagram of one embodiment when the surroundings monitoring device 200 according to the embodiment of the present invention is applied to the dump truck 400.

Specifically, as shown in FIG. 15, the vehicle body information from the vehicle body controller 240 adapted to the dump truck is introduced to the mating face height setting unit 211 in the display controller 210. The mating face height setting unit 211 may automatically change the mating face height Z to 1.0 m from 0 m, or to a value between two values except for 0 m (e.g., between 0.5 m and 1.0 m) in accordance with an operating condition such as the startup of the engine 50, turning on of a power supply 51, releasing of a parking brake 52, gear position change to the drive (D) position from the neutral (N) position by means of a shift lever 53, gear position change to the reverse (R) position from the neutral position by means of the shift lever 53, detection of the start of the traveling by means of a speed sensor 54, or the like. In case of the hydraulic shovel 100, the set height during the swinging may be different from the set height during the traveling. For example, the set height may be 0.5 m when the hydraulic shovel travels whereas the set height may be 1.0 m when the hydraulic shovel swings, because an obstacle shorter than a person is more important to find when the hydraulic shovel travels whereas a person is more important to find when the hydraulic shovel swings.

After the mating face height Z is changed to 1.0 m from 0 m, the detected traveling speed may be entered to the mating face height setting unit 211 from the vehicle body controller 240 if the traveling speed detected by the speed sensor 54 exceeds, for example, 10 km/h. This speed indicates that the vehicle body moves at the increasing speed in the workplace. In response to the information of the traveling speed, the mating face height setting unit 211 may automatically return the mating face height Z to 0 m. It should be noted that whether or not this automatic return takes place may be decided by the operator who operates the input unit 222 of the surroundings monitoring unit 220.

Figure 16:
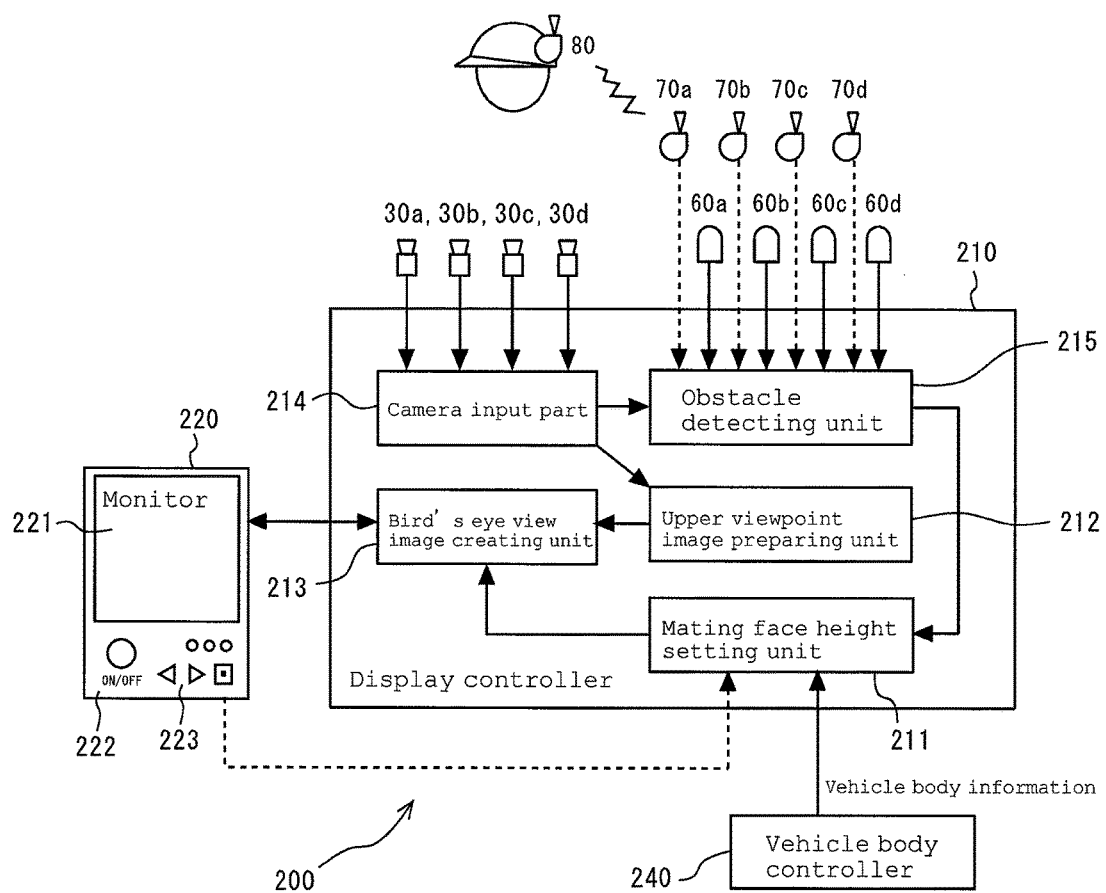
FIG. 16 is a block diagram of one embodiment when the surroundings monitoring device 200 according to the embodiment of the present invention is applied to the dump truck 400. This is a conceptual diagram.

Alternatively, as shown in FIG. 16, the display controller 210 may include a camera input part 214 and an obstacle detecting unit 215 such that images photographed by the camera 30a, 30b, 30c and 30d are introduced to the upper viewpoint image preparing unit 212 and the obstacle detecting unit 215 through the camera input part 214. The obstacle detecting unit 215 processes the introduced images, and detects the presence/absence of the obstacle. When the obstacle detecting unit 215 detects any obstacle near the dump truck, the mating face height setting unit 211 may change the mating face height Z in accordance with the information of the detected obstacle.

The method of detecting the obstacle by means of the obstacle detecting unit 215 is not limited to the above-described image processing. Conventional technologies themselves may be used. For example, as shown in the drawing, obstacle detecting sensors 60a, 60b, 60c, and 60d such as millimeter-wave radars and/or supersonic radars may be disposed around the vehicle body 20. When the obstacle detecting sensors 60a, 60b, 60c and 60d detect any obstacle, the mating face height setting unit 211 may change the mating face height Z to 1.0 m from 0 m in accordance with the information of the detected obstacle.

The amount (value) of the change to be made to the mating face height Z may be selected or switched (increased or decreased) in accordance with the type (kind) or the size of the obstacle detected by the obstacle detecting unit 215. For example, if the detected obstacle is a person or the like, the mating face height Z may be changed to 1.0 m (or 0.5 m), and if the detected obstacle is a vehicle such as a service car or the like, then the mating face height Z may be changed to 0.5 m (or 1.0 m).

The type of the obstacle can easily be determined by the obstacle detecting unit 215 with the information of the detected obstacle. For example, a signal sending device 80 may be attached to a helmet of a worker or the like as shown in FIG. 16. A radio signal having a prescribed frequency that is issued from the signal sending device 80 is detected by radio signal type obstacle detecting sensors 70*a*, 70*b*, 70*c* and 70*d* disposed around the vehicle body 20. It is possible to easily determine whether the obstacle is a person or not, from the information carried by the signal such as the frequency of the signal.

When the mating face height Z is automatically changed based on the detection signal representing the detection of the obstacle and/or the vehicle body information from the vehicle body controller 240, the mating face height Z may automatically be returned to the reference state upon elapse of a prescribed time as in the manual change of the mating face height or upon absence of the detection signal or the vehicle body information. This automatic return may be selected by the operator at his discretion.

Figure 17:
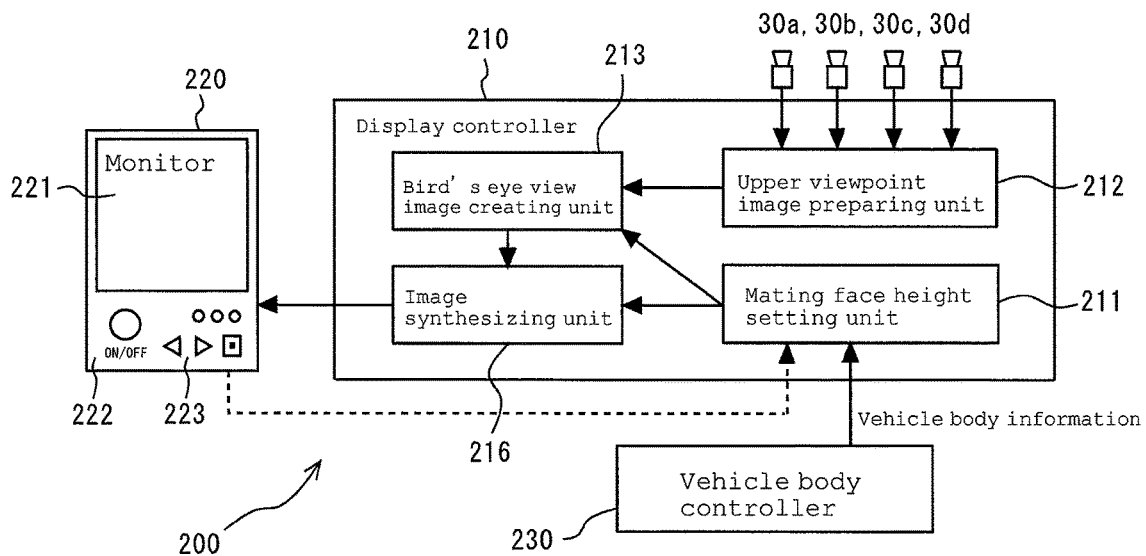
FIG. 17 is a block diagram of an exemplary surroundings monitoring device 200 according to still another embodiment of the present invention.

When the mating face height Z is automatically or manually changed as described above, the changed mating face height Z may be displayed such that the operator can recognize the changed mating face height Z. FIG. 17 illustrates a configuration that additionally includes an image synthesizing unit 216 in the display controller 210 shown in FIG. 2. The image synthesizing unit 216 creates a synthesized image which is prepared by synthesizing the information of the change value applied to the mating face height Z from the mating face height setting unit 211, and the bird's eye view image 300 from the bird's eye view image creating unit 213. The image synthesizing unit 216 sends the synthesized image to the surroundings monitoring unit 220, and the surroundings monitoring unit 220 displays the synthesized image.

Figure 18:
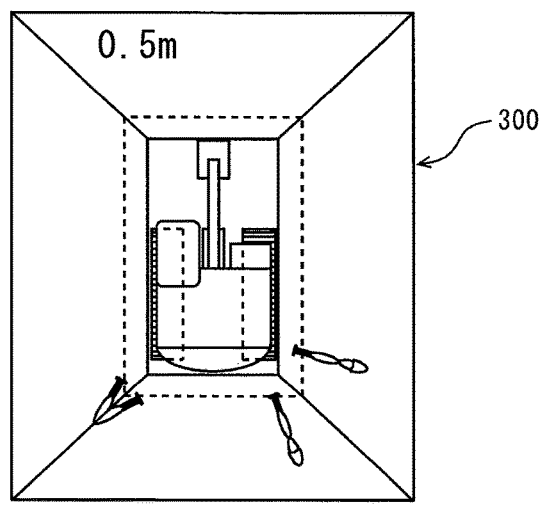
FIG. 18 is a conceptual diagram showing an exemplary synthesized image when information (numeral) relevant to the mating face height Z is combined to the bird's eye view image 300.

FIGS. 18 to 23 illustrate exemplary synthesized images, which are prepared by the image synthesizing unit 216 and displayed on the surroundings monitoring unit 220, respectively. FIG. 18 indicates a concrete character (letter, numeral) to show the changed mating face height Z. The character is synthesized to and displayed on the upper left in the bird's eye view image 300. With such display, the operator can instantaneously and accurately recognize, in the form of concrete numeral and by visual observation (with his eyes), not only a fact that the facing face height Z of the displayed bird's eye view image 300 is changed (adjusted) from the reference mating face height but also how much the mating face height Z is changed. Because the numeral is synthesized to the bird's eye view image 300 and displayed, movements of the line of sight (movements of the operator's eyes) is minimized. Thus, it is easy to see and easy to understand.

Figure 19:
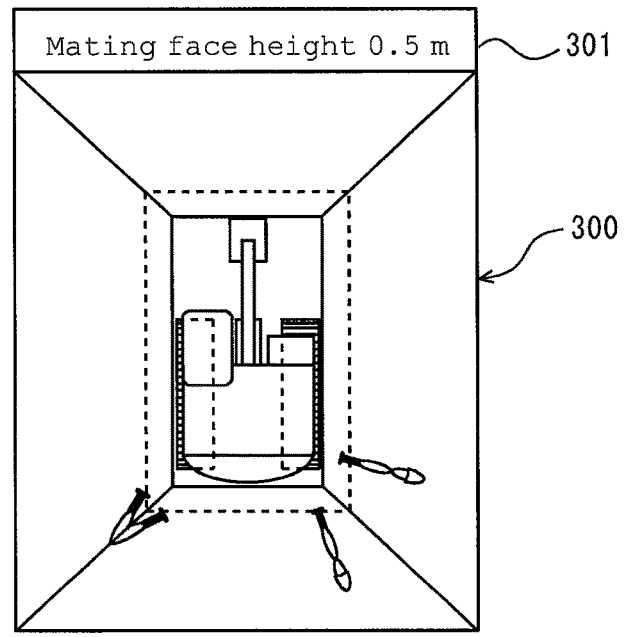
FIG. 19 is a conceptual diagram showing an exemplary synthesized image when information (character) relevant to the mating face height Z is combined to the bird's eye view image 300.
Figure 20:
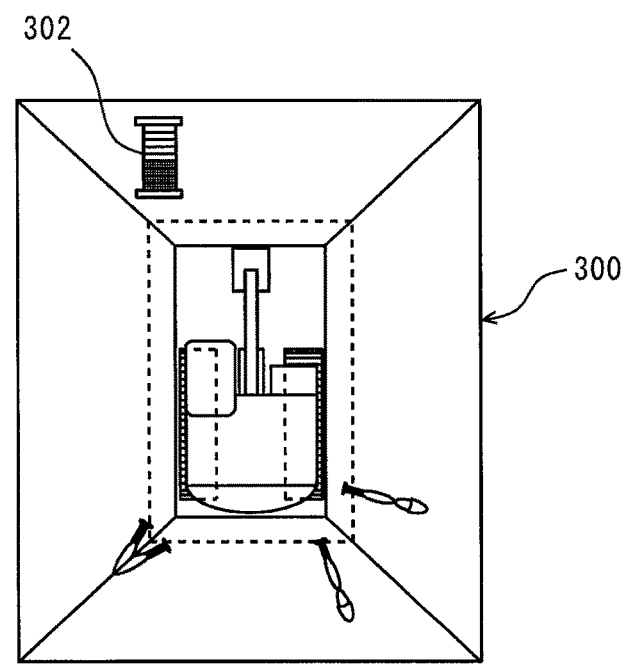
FIG. 20 is a conceptual diagram showing an exemplary synthesized image when information (bar graph 302) relevant to the mating face height Z is combined to the bird's eye view image 300.
Figure 21:
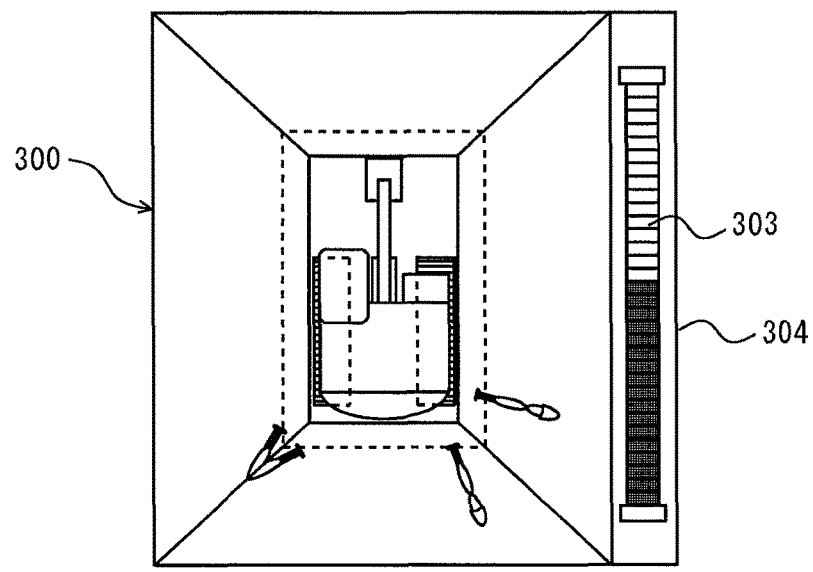
FIG. 21 is a conceptual diagram showing an exemplary synthesized image when information (bar graph 303) relevant to the mating face height Z is combined to the bird's eye view image 300.

FIG. 19 illustrates an example that has a dedicated display area 301 on top of the bird's eye view image 300 for displaying the mating face height. The concrete character (numeral) representing the mating face height Z is displayed in the display area 301, and the display area 301 is synthesized to the bird's eye view image. FIG. 20 illustrates an example that has a bar graph 302 or the like to show the changed value of the mating face height Z in the form of figure (diagram). The diagram is synthesized into the bird's eye view image 300 and displayed. FIG. 21 illustrates an example that has a dedicated display area 304 for displaying the mating face height on the right of the bird's eye view image 300. A large bar graph 303 is synthesized to the display area 304 to indicate the changed value of the mating face height Z. In each of the examples of FIGS. 20 and 21, the height of the colored and changing portion in each of the bar graphs 302 and 303 represents the mating face height Z. The operator can instantaneously and accurately know the amount of change made to the mating face height Z as the operator recognizes the height of the colored portion with his eyes.

Figure 22:
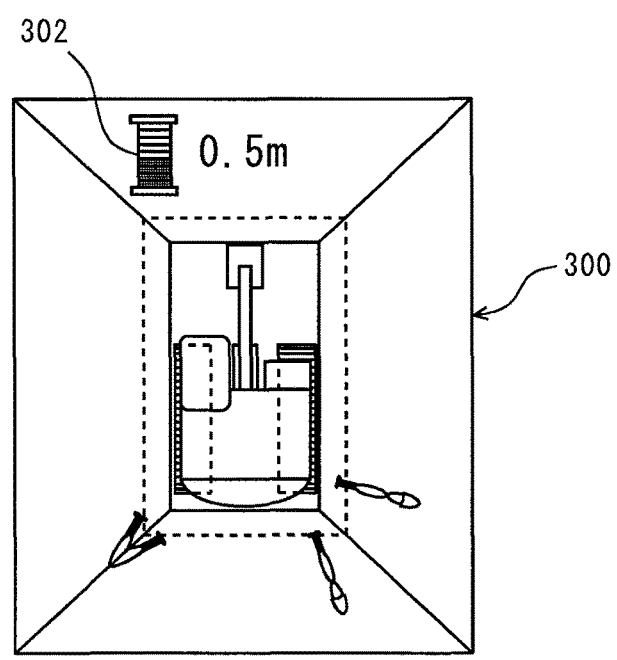
FIG. 22 is a conceptual diagram showing an exemplary synthesized image when information (numeral and the bar graph 302) relevant to the mating face height Z is combined to the bird's eye view image 300.
Figure 23:
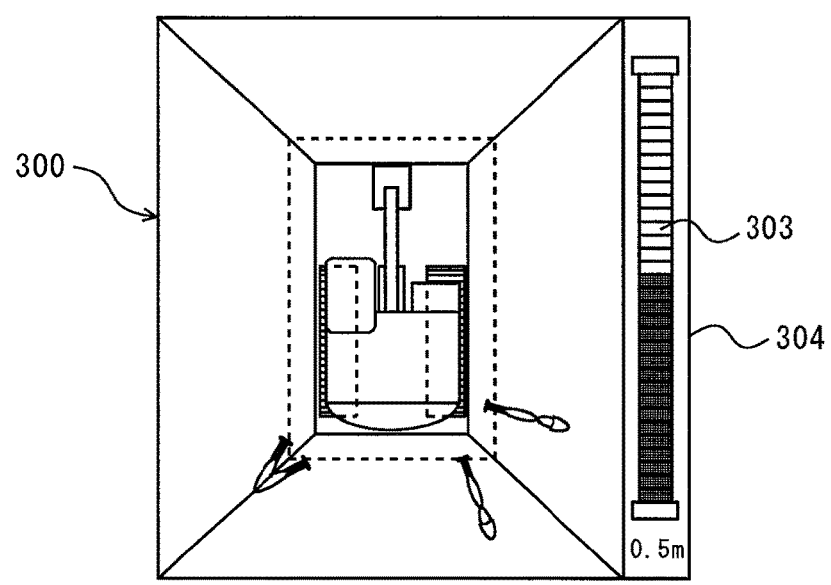
FIG. 23 is a conceptual diagram showing an exemplary synthesized image when information (numeral and the bar graph 304) relevant to the mating face height Z is combined to the bird's eye view image 300.

As shown in FIGS. 22 and 23, the concrete character (numeral) representing the changed value of the mating face height Z may be displayed in addition to the diagram (figure) such as the bar graphs 302 and 303. A method of visually showing the changed value of the mating face height Z together with the bird's eye view image 300 may include use of symbols, a changing color, or a combination thereof, in addition to or instead of the above-described character (letter) and diagram (figure). It should also be noted that the image synthesizing unit 216 shown in FIG. 17 may be added to the configuration shown in any of FIGS. 13, 15 and 16. In this case, the advantages obtained from the configuration shown in FIG. 13, 15 or 16 may additionally be obtained.

REFERENCE NUMERALS AND SYMBOLS

100: Hydraulic shovel (operating machine)
200: Surroundings monitoring unit
210: Display controller
211: Mating face height setting unit (mating face height deciding unit)
212: Upper viewpoint image preparing unit (upper viewpoint image creating unit)
213: Bird's eye view image preparing unit (bird's eye view image creating unit)
214: Camera input part
215: Obstacle detecting unit (three-dimensional object detecting unit)
216: Image synthesizing unit (image synthesizer)
220: Surroundings monitoring unit (display unit)
230, 240: Vehicle body controller
300: Birds' eye view image
301, 304: Mating face height display region
302, 303: Bar graph (FIG.
400: Dump truck (operating machine)
20: Upper swing body (vehicle body)
30, 30*a*, 30*b*, 30*c*, 30*d*: Camera (photographing unit)
31: raw image
35: Upper viewpoint image
e0: Reference extraction region (display image)
e50: Extraction region (display image) when the mating face height is set (changed) to 0.5 m
e100: Extraction region (display image) when the mating face height is set (changed) to 1.0 m
Z: Mating face height

What is claimed is:

1. A surroundings monitoring device of an operating machine, comprising:
   a plurality of cameras mounted on a vehicle body of the operating machine and configured to photograph views at least in a rear direction, a right direction and a left direction of the operating machine to obtain raw images;
   a display unit; and a controller coupled to the plurality of cameras and the display unit, the controller programmed to:

apply an upper viewpoint transformation on the raw images photographed by the plurality of cameras respectively, to prepare upper viewpoint images, extract display images from the upper viewpoint images and synthesize the extracted display images, thereby creating a bird's eye view image, control the display to display the bird's eye view image, set a hypothetical mating face height that is used when the upper viewpoint images prepared by the upper viewpoint image preparing unit are synthesized, wherein the hypothetical mating face height is based on an operation of the machine, expand a region of each said display image to be extracted from the associated upper viewpoint image beyond a standard extraction region in a radially outward direction from a center of the operating machine, upon increasing of the mating face height set, and extract the expanded region, reduce a size of each said extracted region such that the reduced size of the region becomes equal to a size of the standard extraction region, and synthesize the reduced display images, with an image representing the operating machine being positioned at a center, such that the display images are displayed in an overlapping manner at a border between each of two adjacent display images.

2. The surroundings monitoring device of an operating machine according to claim 1, wherein the controller is further programmed to return the mating face height to a reference mating face height upon elapse of a prescribed time, if the mating face height is set to a height different from the reference mating face height.

3. The surroundings monitoring device of an operating machine according to claim 1, wherein the controller is further programmed to synthesize two or more of a character, a figure, and a symbol, which represents the mating face height, to the created bird's eye view image, thereby creating a synthesized image, wherein the display unit displays the created synthesized image.

4. The surroundings monitoring device of an operating machine according to claim 1, wherein the mating face height is based on operation of an operation lever condition included in the operating condition of the operating machine.

5. The surroundings monitoring device of an operating machine according to claim 1, wherein the operation of the machine is at least one of operation of a hydraulic shovel of the machine, operation of a lever for traveling of the machine, an operation of a lever for swinging of the machine, startup of an engine of the machine, turning on of a power supply of the working machine, releasing of a brake of the machine, a gear position change of the machine, and detection of a start of a traveling by a speed sensor of the machine.

* * * * *